ёё

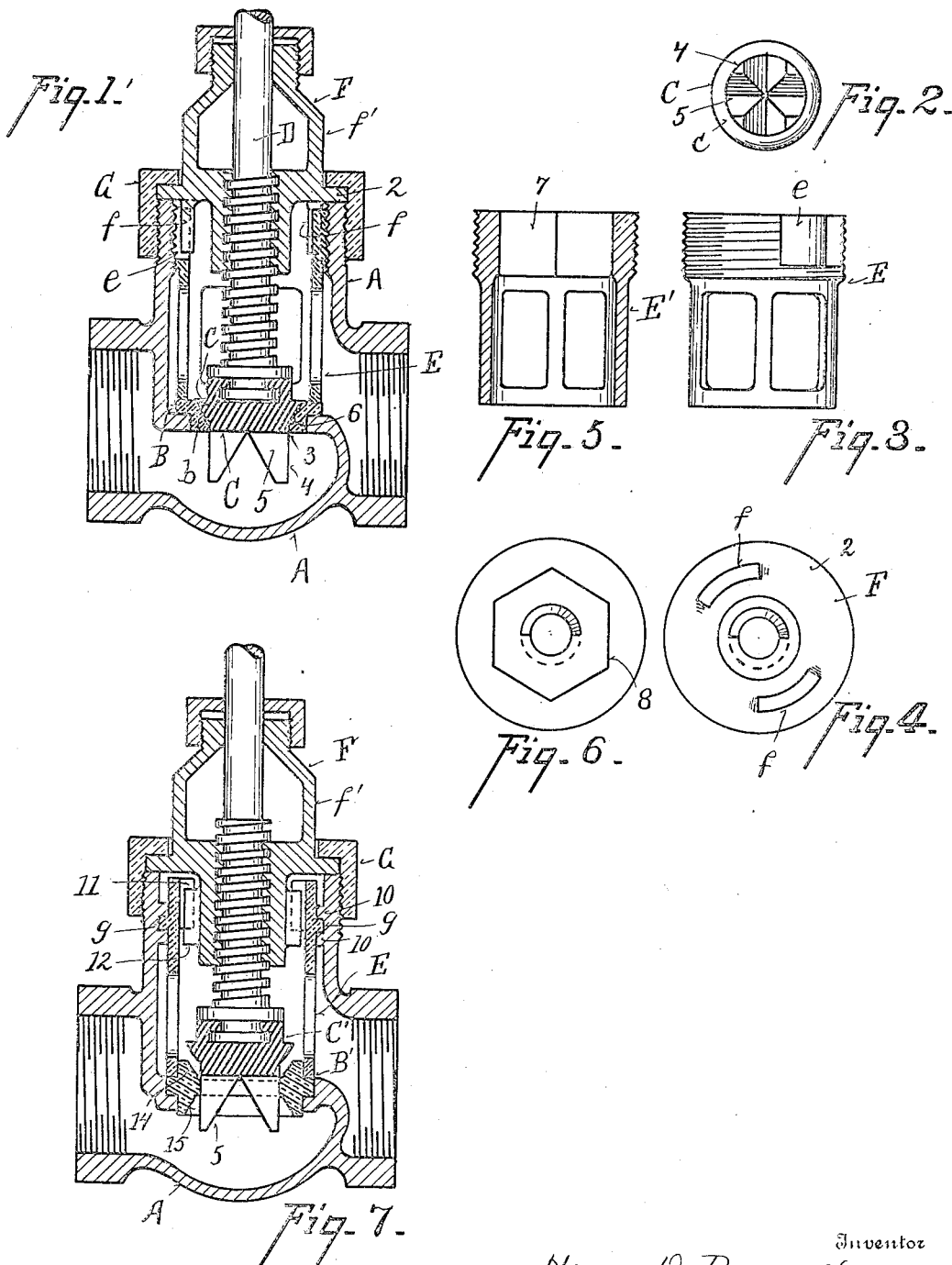

UNITED STATES PATENT OFFICE.

HENRY D. POWNALL, OF CINCINNATI, OHIO.

VALVE.

No. 831,742.   Specification of Letters Patent.   Patented Sept. 25, 1906.

Application filed June 19, 1905. Serial No. 265,910.

*To all whom it may concern:*

Be it known that I, HENRY D. POWNALL, a citizen of the United States, residing at Cincinnati, in the county of Hamilton and State of Ohio, have invented certain new and useful Improvements in Valves, of which the following is a specification.

My invention relates to improvements in valves.

One of its objects is to provide an improved valve with removable seat.

Another object is to provide improved mechanism for locking the seat in place and detaching the same when required.

Another object is to provide an improved valve and seat whereby wear and injury to the seat is prevented.

It further consists in certain details of form, combination, and arrangement, all of which will be more fully set forth in the description of the accompanying drawings, in which—

Figure 1 is a central vertical section through one form of my improved valve. Fig. 2 is a bottom plan view of the valve. Fig. 3 is a side elevation of the cage which serves to lock the seat in place. Fig. 4 is a bottom plan view of the bonnet. Fig. 5 is a central vertical section through the cage, showing a modification thereof. Fig. 6 is a bottom plan view of a modified bonnet to be used with the cage, Fig. 5. Fig. 7 is a view, similar to Fig. 1, showing a reversible valve-seat and modified forms of the cage and bonnet.

My improved valve may be manufactured in various forms—such as angle, straight-globe, cross-valves, check and regulator valves—depending upon the service for which it is required.

As shown in Figs. 1 to 4, A represents the casing, frame, or shell. B represents the detachable seat; C, the valve-disk, having a pivotal connection with the valve-stem D. E represents a cage which serves to lock the seat in place; F, the bonnet, through which the valve-stem projects, and G a threaded nut which clamps the bonnet in place. The cage has threaded engagement with the interior of the shell, so as to be screwed down to clamp the detachable seat in place and is also provided with recesses $e$, which are engaged by projections $f$ of the bonnet. The bonnet has a polygonal wrench-seat at $f'$, by which it may be turned by an ordinary wrench to screw the cage into engagement with the valve-seat. When the cage is screwed into position, its upper edge is below the upper edge of the shell, so that the flange 2 of the bonnet makes a tight joint with the shell and is locked in this position by the nut G. Thus the cage may be screwed into or out of the shell at any time without requiring the use of special tools. The seating-face $c$ of the valve-disk is adapted to engage and form a tight joint with the seating-face $b$ of the seat B to close the valve. The valve-seat also has a cylindrical portion or face 3, which snugly fits the exterior of the cylindrical portion 4 of the valve-disk. 5 represents grooves in the end of the projection 4, preferably of V shape. An annular recess 6 is also preferably provided between the faces $b$ 3 of the valve-seat. Thus when the valve commences to open the cylindrical portion of the valve prevents the escape of fluid across or between the slightly-separated faces $b$ $c$, and the resulting tendency to "wiredraw" or cut grooves in said faces. The escape through the valve is thus practically cut off until the apex of the grooves 5 pass the cylindrical face 3, which does not occur until the faces $b$ $c$ have been separated a sufficient distance to prevent injury thereto. (See position Fig. 7.) The cage also serves as a guide for the valve-disk, causing it to always seat properly on the valve-seat. Thus arranged, the cage and valve-seat are not liable to become loose after being once adjusted, since the clamping of the bonnet locks the cage in place. Also no gasket-joints are required. The interengaging parts of the bonnet and cage may be variously modified. Thus in the modification Figs. 5 and 6 the cage E' has a polygonal seat 7, into which extends the polygonal projection 8 of the bonnet, by means of which the cage may be rotated.

In Fig. 7 I have shown segmental threads or short spiral ribs $g$ on the cage engaging corresponding ribs 10 on the interior of the shell, the shell also having vertical ribs 11 to engage vertical ribs 12 on the bonnet, by means of which the cage may be rotated to lock the seat in place. The seat B' (shown in Fig. 7) has separate seating-faces 14 15 on opposite sides and may be reversed when desired. The seat and cage may, if desired, be made in one piece.

The valve herein described is simple in form, can be readily adapted to the different styles required, does not require extra work or to be chucked more than once in construction, since all the work is done from one side.

The valve herein shown and described is capable of considerable modification without departing from the principle of my invention.

Having described my invention, what I claim is—

1. In a valve, a shell, a detached seat, a valve-disk to close the opening in said seat, a cage having threaded engagement with the shell to lock the seat in place, a bonnet seating upon a face on the shell, a nut to clamp the bonnet in place and interengaging members on the cage and bonnet to rotate the cage when the bonnet is rotated.

2. In a valve, a shell, a detachable seat, a valve-disk to close the opening in said seat, a cage having interengaging contact with the shell to lock the cage and seat in place, a bonnet having an annular seat upon the shell, means for clamping the bonnet upon the shell, and interengaging members on the cage and bonnet to adjust the cage by the rotation of the bonnet.

In testimony whereof I have affixed my signature in presence of two witnesses.

HENRY D. POWNALL.

Witnesses:
C. W. MILES,
A. M. CORMACK.